United States Patent [19]

Crichton, Jr.

[11] Patent Number: 5,046,524
[45] Date of Patent: Sep. 10, 1991

[54] SAFETY RELIEF VALVE
[75] Inventor: Richard H. Crichton, Jr., Pineville, La.
[73] Assignee: Dresser Industries, Inc., Dallas, Tex.
[21] Appl. No.: 556,773
[22] Filed: Jul. 23, 1990
[51] Int. Cl.$^5$ ............................................. F16K 17/32
[52] U.S. Cl. ................................................. 137/478
[58] Field of Search ....................... 137/478, 476, 477

[56] References Cited

U.S. PATENT DOCUMENTS

| | | |
|---|---|---|
| 1,200,875 | 10/1916 | Roy . |
| 1,696,452 | 12/1928 | Raymond . |
| 2,584,523 | 2/1952 | Work . |
| 2,821,208 | 1/1958 | Farris ................................. 137/478 |
| 3,354,900 | 11/1967 | Ferrill . |
| 3,520,326 | 7/1970 | Bowen et al. .................. 137/478 X |
| 3,572,372 | 3/1971 | Moore . |
| 3,897,802 | 8/1975 | Bass ..................................... 137/478 |
| 4,130,130 | 12/1978 | Stewart et al. .................. 137/478 X |
| 4,708,164 | 11/1987 | Scallan ............................. 137/478 X |

FOREIGN PATENT DOCUMENTS 577161  6/1959  Canada ............................... 137/478

Primary Examiner—Stephen M. Hepperle
Attorney, Agent, or Firm—Joseph T. Yao

[57] ABSTRACT

A safety relief valve having a disc carrier with a downwardly extending flange which overlaps an adjusting ring located on a valve seat member for providing a quicker full rated lift and shorter blowdown. The downwardly extending flange has a beveled end to form an orifice between the outer peripheral surface of the adjusting ring member for flowing media.

10 Claims, 1 Drawing Sheet

SAFETY RELIEF VALVE

FIELD OF INVENTION

This invention relates to a valve for relieving excess pressure, and more particularly to a safety relief valve that achieves full lift at a pressure slightly above a set pressure and closes fully at a pressure slightly below the set pressure for the safety relief valve.

BACKGROUND OF THE INVENTION

There are a variety of applications for safety relief valves in the commercial as well as residential environment. To insure safety, the American Society of Mechanical Engineers (ASME) has prepared a code of minimum requirements for broad classifications of uses for pressure relief valves. Because of the great damage that can result from a faulty safety relief valve on a power boiler, the ASME Code Section I is the most stringent. It requires that a safety relief valve for a power boiler: 1) close at a closing pressure no lower than 96% of the set pressure for that valve; and 2) have the valve attain a full rated lift at a pressure no higher than 103% of the set pressure. In contrast, for an unfired pressure vessel, the ASME Code Section VIII requires a pressure relief valve have a closing pressure not lower than 93% of the set pressure, and a full rated lift at a pressure not to exceed the set pressure by more than 10%.

Optimally, a valve should open when the system pressure exceeds a predetermined set point for pressure and quickly reach a full open or "full lift" position without excessive overpressure buildup. Also, the valve should close as soon as it has vented the excess volume that is sufficient to return the system pressure below the set pressure and provide a rapid closing or "blowdown" to prevent an excessive loss of fluid from the system.

Attempts have been made at providing a pressure relief valve that will meet the demanding standards of ASME Code Section I. Stewart et al, U.S. Pat. No. 4,130,130 disclosed a safety relief valve that included a nozzle ring and a curved inwardly facing surface formed on a shroud portion of the valve head to define an annular secondary flow orifice. This orifice was too large to provide any restriction to flow and therefore failed to assist in the lifting force on the valve to achieve full opening and flow.

Scallan U.S. Pat. No. 4,708,164 addressed the problem of valve "chatter". The Scallan patent disclosed a safety relief valve having an adjusting ring and a valve carrier with a downwardly projecting peripheral flange. The ring included an axially projecting annular portion that extended towards the valve carrier to form an orifice to control the closing or "blowdown" of the valve. The outer peripheral surface of the ring formed a second orifice with the flange to aid in the lifting of the valve to a full open position. Though this invention provided stability in opening and closing of the valve, the closure of this valve did not meet the minimum required standard for a power boiler as dictated by ASME Code Section I.

SUMMARY OF THE INVENTION

It is an object of this invention to provide full and rapid opening of a safety relief valve at a pressure slightly above a set pressure level, as well as full and rapid closing of the valve at a pressure slightly below the set pressure level.

It is a feature of the invention to include an adjusting ring located on the valve seat member that cooperates with the valve carrier member to create a pair of orifices to aid in the rapid opening and rapid closing of the safety relief valve.

It is a feature of the invention to include a disc carrier having a radial chamber peripherally defined by a bevel surface and a downwardly extending flange with an inwardly facing beveled end to provide a rapid closure of a disc against a valve seat.

A safety relief valve in accordance with the present invention includes a valve body with a fluid inlet, fluid outlet, and valve seat encircling the inlet. The valve body houses a disc member movable toward and away from the seat and a disc carrier with a cavity for the disc, a first chamber radially adjacent the cavity and a downwardly projecting skirt flange with an inwardly facing beveled end for forming a second chamber and an annular surface within the disc carrier. A ring member is movably located on the valve seat and adjacent the disc carrier. The ring member has an axial projecting annular portion that extends toward the disc carrier to form a radial orifice and an outer peripheral surface forming a peripheral orifice with the beveled end of the flange. An adjustable spring assembly biases the disc into sealing engagement with the valve seat and the disc carrier into cooperation with the ring member. In accordance with an important aspect of the invention, the bevel surface of the first chamber and the bevel end of the extending flange allow pressure within the safety relief valve to reduce at a faster rate as pressure in the fluid inlet reduces, thereby providing a quicker closing or a shorter "blowdown".

Other objects, features and advantages of the invention will be apparent in the following description and claims in which the invention is described, together with details to enable persons skilled in the art to practice the invention, all in connection with the best mode presently contemplated for the invention.

BRIEF DESCRIPTION OF THE DRAWINGS

The drawings accompanying the disclosure and the various views thereof may be briefly described as.

DETAILED DESCRIPTION OF THE INVENTION

The preferred embodiment of the present invention is illustrated by way of example in FIGS. 1-4. With specific reference to FIG. 1, a safety relief valve 10 includes a hollow valve body 12 having an inlet passage 14 and an outlet passage 16 for incompressible or compressible fluid flow.

Figure 1:
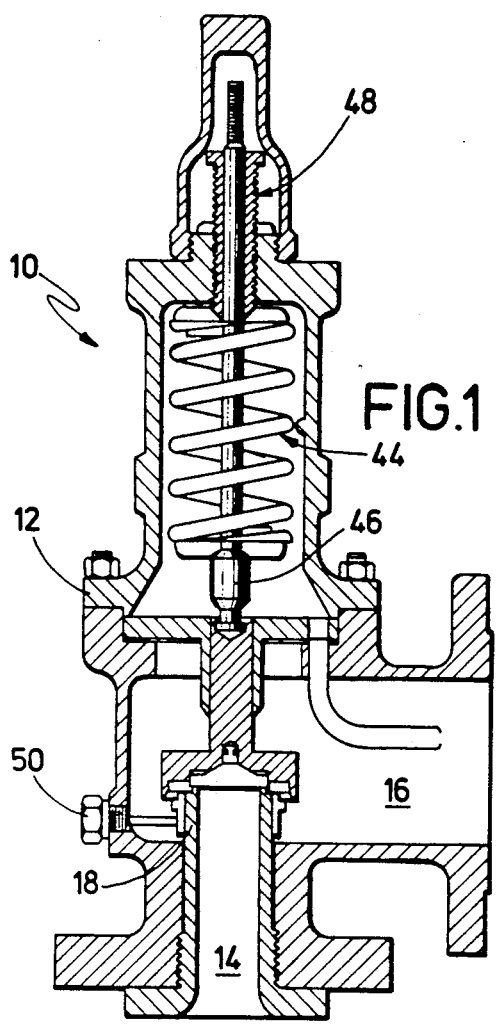
FIG. 1 is a cross section view of a safety relief valve of this invention.
Figure 3:
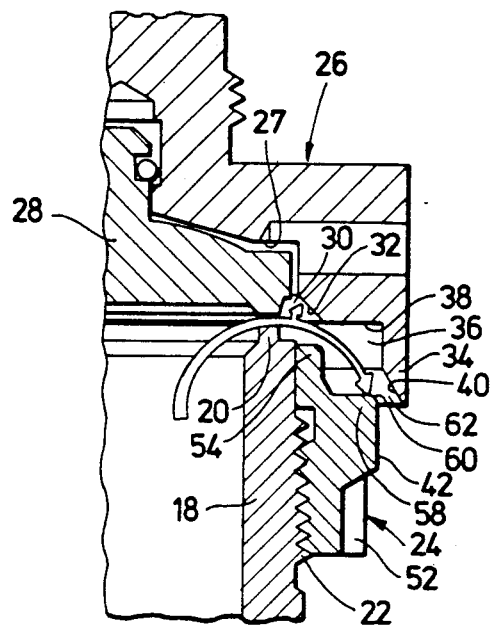
FIG. 3 is a further enlarged fragmentary view of FIG. 2 showing parts of the valve in a second operative position.
Figure 4:
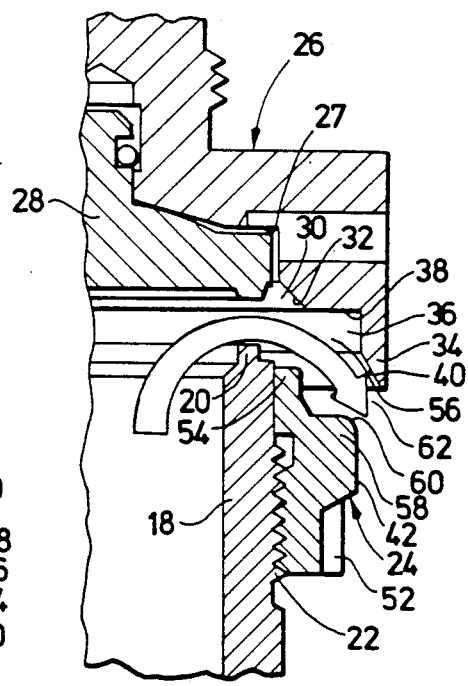
FIG. 4 is a view similar to FIG. 3 showing parts of the valve in third operative position.

As shown in greater detail in FIGS. 3 and 4, a valve seat member 18 is mounted within inlet 14 of valve 10. The valve seat member 18 has an annular valve seat 20 forming the upper end and a series of threads 22 along the exterior of the upper portion of valve seat member 18 and below valve seat 20 to receive an interiorly threaded ring member 24.

A disc carrier 26 having a cavity 27 into which a disc 28 is secured, is positioned directly over valve seat 20. The disc 28 is constructed and arranged for sealing engagement with annular valve seat 20 and preferably has a diameter at least equal to the diameter of the annular valve seat 20. The disc carrier 26 has adjacent to cavity 27, a radial chamber 30 having its perimeter defined by a bevel surface 32. Bevel surface 32 is preferably at a 45° angle relative to the axis of inlet 14. Additionally, the disc carrier 26 has a downwardly projecting skirt flange 34 which forms an outer chamber 36 having an interior surface perpendicular to an annular surface 38 within disc carrier 26. On the free end of skirt flange 34 is an inwardly facing bevel 40, preferably at a 45° angle, which is in close proximity to the peripheral surface 42 of ring 24.

Figure 2:
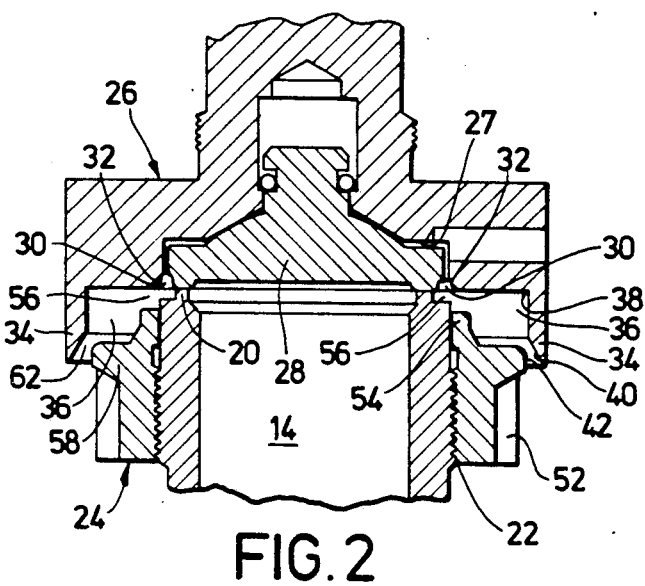
FIG. 2 is an enlarged fragmentary cross section of a portion of the safety relief valve in FIG. 1 showing in detail a disc carrier, a disc and valve seat in a first operative position.

The disc carrier 26 is coupled to a spring assembly 44 through a valve actuating rod 46. The spring assembly 44 exerts a downward force on the disc carrier 26, biasing the disc member 28 into sealing engagement with valve seat 20 to define a closed position of the valve 10 as shown in FIG. 2. An adjusting mechanism 48 is located at the top portion of valve 10 to calibrate the force exerted by the spring assembly 44 and thereby provide the set pressure of the safety relief valve 10.

The ring member 24 may be adjusted by rotating on threads 22 toward or away from disc carrier 26. A locking member 50 is provided through valve body 12 into engaging slots 52 formed in lower end of ring 24 to prevent inadvertent movement of ring 24.

Ring 24 includes an upper end portion 54 that axially projects toward bevel surface 32 of disc carrier 26. This end portion 54 may be adjusted to a position that is in close proximity to surface 32 when valve 10 is in the closed position as shown in FIG. 2. This position forms a radial orifice 56 with surface 32. The ring 24 also includes an enlarged diameter portion 58 forming the outer peripheral surface 42 which preferably has an upper radiused edge 60 to form a peripheral orifice 62 with flange 34 on carrier 26. Preferably the rounded edge 60 cooperates with the beveled end 40 of flange 34 to vary the area of peripheral orifice 62 as the carrier 26 moves upwardly during the opening of valve 10.

The operation of the safety relief valve 10 requires that the spring assembly 44 be set to exert a proper loading or biasing force on disc carrier 26 and disc 28, equal to the set pressure of the valve. The compressor force required on the disc 28 to initially open or "crack" the valve is of a predetermined value slightly lower than the set pressure of the valve. When the inlet pressure is equal to the set pressure, some media flows past the seating surface 20 and into radial chamber 30. As a result of the restriction of flow in radial orifice 56, pressure accumulates in chamber 30 to help lift disc member 28 higher off of valve seat 20. Because the inlet pressure can now act over a larger area (area of disc 28 and chamber 30), a greater force is available to overcome the force of spring 44. By adjusting ring member 24, the opening in the radial orifice 56 can be altered, thus controlling pressure accumulation in radial chamber 30 to overcome the spring force and displacement of disc 28.

As the safety valve 10 opens wider (see FIG. 3), an instantaneous flow of media enters outer chamber 36.

Because of the restriction to flow through peripheral orifice 62 formed between the beveled end 40 of skirt flange 34 and the outside peripheral surface 42 of ring member 24, an additional force acts against surface 38 in outer chamber 36 to cause the disc member 28 to lift substantially to the full open position shown in FIG. 4.

At the full open position, the fluid flow is restricted by the valve seat area rather than by the radial or peripheral orifices 56, 62.

As the inlet pressure drops, both disc carrier 26 and disc member 28 start to move toward valve seat 20 under the force of spring assembly 44. The disc member 28 will seat against valve seat 20 when the inlet pressure reaches a closing pressure which is slightly below the set pressure. This difference between set pressure and closing pressure of the valve is divided by the set pressure and expressed as "blowdown". "Blowdown" is caused by the result of the spring force not being able to overcome the summation of the forces under disc member 28, radial chamber 30 and outer chamber 36 until the inlet pressure drops below the set pressure.

As shown in FIG. 3, both the beveled surface 32 and the beveled end 40 of skirt flange 34 allow the pressure to reduce at a faster rate as the inlet pressure reduces, thus giving the valve a shorter blowdown which reduces the pressure within radial chamber 30 and outer chamber 36. The beveled end 40 of skirt flange 34 forms a larger peripheral orifice 62 with edge 60 to allow media to flow unrestricted and thereby diminishing the lifting force within outer chamber 36. Likewise, bevel surface 32 forms a large radial orifice 56 with upper end portion 54 to reduce the lifting force in radial chamber 30 and allow media to flow less restricted than the prior art. The "blowdown" can be decreased by adjusting ring member 24 away from disc carrier 26 and creating larger orifices.

The safety relief valve 10 of this application can be adjusted to provide a full rated lift with less accumulated pressure and a shorter "blowdown" to meet the ASME Code Section I requirements for power boilers. This invention provides a design to convert a standard valve certified for the ASME Code Section VIII to meet the more stringent Section I requirements.

It is to be understood that the terminology as employed in the description and claims incorporated herein is used by way of description and not by way of limitation, to facilitate understanding of the structure, function and operation of the combination of elements which constitute the present invention. Moreover, while the foregoing description and drawings illustrate in detail one successful working embodiment of the invention, to those skilled in the art to which the present invention relates, the present disclosure will suggest many modifications in the construction, as well as widely differing embodiments in applications without thereby departing from the spirit and scope of the invention. The present invention, therefore, is intended to be limited only by the scope of the appended claims and applicable prior art.

What is claimed is:

1. A safety relief valve comprising:
   a) a valve body having a fluid inlet, a fluid outlet and a valve seat encircling said inlet;
   b) a disc member movable toward and away from said seat;
   c) a disc carrier member for said disc having a downwardly projecting skirt flange with an interior surface perpendicular to an annular surface within said disc carrier member and adjacent a free end having an inwardly facing bevel, said flange forming an outer chamber;

d) an adjustable spring biasing said disc into sealing engagement with said seat until a fluid pressure in said inlet exceeds a predetermined value; and e) a ring member movably located on said seat, said ring member having an outer peripheral surface forming a peripheral orifice with said bevel of said free end of said flange.

2. The safety relief valve of claim 1 wherein said disc carrier further comprises a cavity for receiving said disc and a radial chamber adjacent said cavity.

3. The safety relief valve of claim 2 wherein said ring member further comprises an axially projecting annular portion extending toward said disc carrier forming a radial orifice.

4. The safety relief valve of claim 3 wherein said radial chamber has a bevel surface opposite said disc cavity.

5. The safety relief valve of claim 4 wherein said axially projecting portion of said ring member forms said radial orifice with said bevel surface of said radial chamber.

6. The safety valve of claim 1 wherein said ring member has a rounded edge on said outer peripheral surface to form said peripheral orifice with said bevel of said free end of said flange.

7. The safety relief valve of claim 1 wherein said outer peripheral surface of said ring member is disposed within said flange, wherein said peripheral surface and the inner surface of said flange form said peripheral orifice.

8. The safety relief valve of claim 1 wherein said bevel of said free end is at a 45° angle with respect to said flange.

9. The safety relief valve of claim 4 wherein said beveled surface of said radial chamber is at an angle of 45° relative to the axis of said fluid inlet.

10. A method for rapidly closing a safety relief valve having a spring biased disc member therein movable in response to a predetermined inlet pressure of fluid media comprising the steps of:

a) restricting flow of the media with said disc member over an inlet of said valve whereby fluid pressure is applied to the exposed area of said disc member to hold said disc member off a valve seat;

(b) reducing pressure in an outer chamber of a disc carrier, said outer chamber formed by a downwardly projecting skirt flange with an interior surface perpendicular to an annular surface within said disc carrier and a free end having an inwardly facing bevel, by permitting fluid media to flow through a peripheral orifice formed between an outer peripheral surface of a ring member and said bevel of said free end of said flange of said disc carrier; and c) reducing pressure from a radial chamber of said disc carrier through a radial orifice formed between a bevel surface of said radial chamber of said disc carrier and an axial portion of said ring member whereby said peripheral and radial orifices are large enough to allow media to flow out of said outer and radial chambers, so that pressure reduces rapidly as the pressure in the inlet reduces, permitting said spring loaded disc member to close rapidly on said valve seat.

* * * * *